Oct. 6, 1953   R. T. REESE   2,654,643
UNIVERSAL BEARING
Filed July 10, 1952
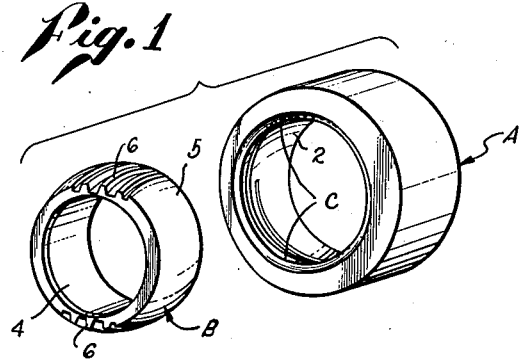
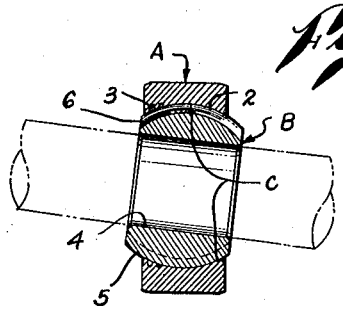
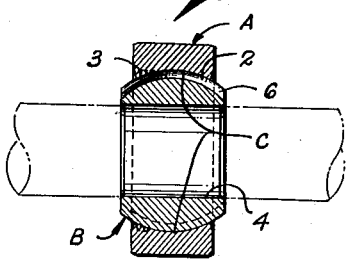
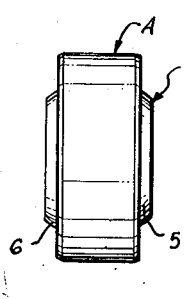
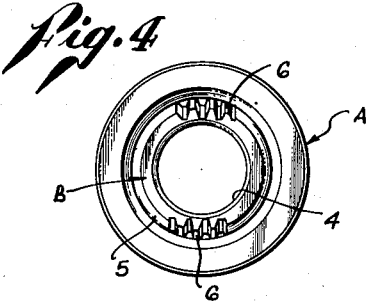
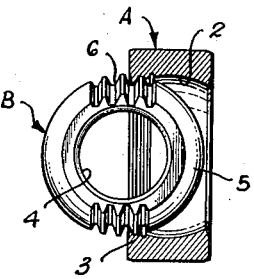
INVENTOR.
RICHARD T. REESE
BY
Attorney

Patented Oct. 6, 1953

2,654,643

UNITED STATES PATENT OFFICE 2,654,643

UNIVERSAL BEARING

Richard T. Reese, Van Nuys, Calif.

Application July 10, 1952, Serial No. 298,070

8 Claims. (Cl. 308—72)

This invention relates to and has for an object the provision of a self aligning bearing of the ball and socket type which readily adjusts itself to any slight misalignment with another or other bearings adapted to support a shaft or rod, and is simple, effective and economical in cost.

A more specific object is to provide a universally adjustable bearing embodying a stationary socket member formed with an annular body adapted to be press fitted into a bore of a support and having a spheroidal socket open at one side of the body at least and provided with internal threads at said opening; and a spheroidal member axially bored to rotatably or fixedly receive a shaft or rod and externally threaded on the equatorial area right angularly relative to said bore so that it may be screwed into and removed from a seat in the socket member when positioned so that the threads thereon will mesh with the threads on the socket member; and yet when seated in the socket and the bore therein is coaxial with that of the socket or even inclined to a substantial extent the spheroidal member will be held against detachment from the socket member by application of forces in any direction coaxially of the two members.

It is well known that in the installation of line shafting, for example, for operating both large and small machines, and also in control lines for mechanisms, precision and accuracy in alignment of bearings is necessary to optimum operation, durability of installations and economy. Heretofore, bearings such as pillow blocks and other types having separable parts have required excessive labor and time and in spite of extreme care installations have been faulty and have occasioned excessive service and attention in order to obtain even mediocre satisfaction and efficiency in operation.

Hence, it is an over-all and important object to provide a universally adjustable bearing embodying but two parts, one of which is self adjusting relative to and is quickly attachable to and removable from the other part without employment of bolts or screws and which are so arranged that when the bearing member is mounted in the socket member it is freely self adjusting for the purpose of alignment with a similar member of another bearing for operatively supporting a shaft or rod with a minimum of care and precision.

In consideration of this invention I refer to Letters Patent of the United States, No. 2,531,892 granted to me on November 28, 1950 for a bolt and nut fixture which is a forerunner of my present invention and discloses a somewhat similar device adapted for a different purpose but nevertheless illustrating the broad concept of the present invention.

Other and more specific objects will appear in the description of the structure and use of my present improvements.

I have shown a preferred form of bearing embodying my improvements in the accompanying drawing, in which:

Fig. 1 is a perspective exploded view;

Fig. 2 is a diametrical sectional view with the two members of the unit in coaxial relationship;

Fig. 3 is a view similar to Fig. 2 with the inner or bearing member disposed at an extreme angle relative to the socket member;

Fig. 4 is an end view of the unit;

Fig. 5 is a side view of the unit; and

Fig. 6 is a sectional view in a diametrical plane showing the bearing member disposed for insertion into the socket member whereat the axes of the two members are right angularly disposed.

The complete unit includes only an annular socket member A and inner spheroidal bearing member B which for purpose of reference herein is termed a ball.

Member A preferably but not necessarily is of annular form so as to tightly fit into a bore of a support (not shown) whereby the bearing is anchored and has an opening C therein with a spheroidal surface 2 with internal threads 3 formed at one or both ends thereof adjacent on opening C. Usually only one thread 3 is required. The surface 2 extends equidistantly in opposite directions from the equatorial plane of member A and may approximate in width from one fourth to one third of the diameter of surface 2.

Member B while spheroidal is almost spherical and has an equatorial bore 4 therein which at its open ends defines the spheroidicity of said member B. Member B has a spheroidal surface 5 complemental to and engageable with surface 2 of member A when the members A and B are disposed as shown in Figs. 2 and 3 and also is formed on an equatorial area of its outer surface with a few threads 6 formed at an angle of 90° or less relative to a diametrical plane, so that when the ball B is disposed with its bore 4 at right angles with respect to the opening C of member A and the ball is rotated it may be screwed into opening C by reason of the engagement of threads 6 on the ball with the thread 3 on member A until the threads are disengaged. At such time the bore 4 will be crosswise of opening C and the ball may be turned in said opening until bore 4 registers with opening C and the surface 5 of ball A will engage surface 2 of the socket. Obviously, the surface 5 being of greater diameter than the thread 3, the ball may not be pulled or pushed outwardly from the socket by forces applied axially or diametrically in any direction. However the ball A is free to turn in the socket to a maximum extent determined by the size of opening C as shown in Fig. 3, to dispose the bore 4 for receiving a shaft or rod (not shown).

Essentially I have provided a simple but effective bearing which is self adjusting and self alignable with other bearings or parts for operatively supporting a shaft or rod, and embodies but two members which are readily attachable and separable without the employment of bolts, nuts and tools and then only for purpose of installation, service or replacement, and which otherwise is adaptable for use under varying conditions of operation.

I claim:

1. A universal bearing comprising: a first member having a spheroidal open socket and formed with internal threads adjacent the opening of said socket, and a second member of spheroidal form diametrically bored and having external threads on its equatorial area extended at a right angle relative to said bore and adapted to mesh with the threads on said first member when the bore of the second member is disposed at a right angle relative to the socket of the first member for attaching and detaching said members by rotation of one member relative to the other.

2. A universal bearing comprising: a first member having a spheroidal open socket and formed with internal threads adjacent the opening of said socket, and a second member of spheroidal form diametrically bored and having external threads on its equatorial area extended at a right angle relative to said bore and adapted to mesh with the threads on said first member when the bore of the second member is disposed at a right angle relative to the socket of the first member for attaching and detaching said members by rotation of one member relative to the other, said second member having spheroidal surfaces on opposite sides of its threads complemental to and engageable with the speroidal surface of said socket when the bore of the second member is coaxial with the socket of the first member.

3. A universal bearing comprising: a first member having a spheroidal open socket and formed with internal threads adjacent the opening of said socket, and a second member of spheroidal form diametrically bored and having external threads on its equatorial area extended at a right angle relative to said bore and adapted to mesh with the threads on said first member when the bore of the second member is disposed at a right angle relative to the socket of the first member for attaching and detaching said members by rotation of one member relative to the other, the threaded portion of said first member being of less diameter than the equator of said socket and said second member, whereby to prevent detachment of said members by forces axially applied thereto.

4. A universal bearing comprising: a first member formed with a spheroidal socket open on opposite sides of its equator and screw threaded at said opening, and a second member formed with a spheroidal surface complemental to and fitting the spheroidal surface of said socket, said second member having an equatorial bore therein for receiving a shaft or rod and external screw threads disposed at an angle from the axis of said bore and adapted to mesh with the threads on said first member for attaching and detaching said members.

5. A universal bearing comprising: a first member formed with a spheroidal socket open on opposite sides of its equator and screw threaded at said opening, and a second member formed with a spheroidal surface complemental to and fitting the spheroidal surface of said socket, said second member having an equatorial bore therein for receiving a shaft or rod and external screw threads disposed at an angle from the axis of said bore and adapted to mesh with the threads on said first member for attaching and detaching said members, the threads on said members being disengaged when the second member is rotated so as to position the bore of the second member in registration with the opening to said socket.

6. A universally adjustable bearing comprising: a first member having a spheroidal socket with a central opening at a side thereof formed with an internal screw thread around said opening, and a second spheroidal member having a diametrical bore therein for receiving a shaft or the like and also having external screw threads on its equatorial area adapted to mesh with the screw thread on said first member only when the bore of the second member is disposed with its axis at a right angle to the opening of the first member.

7. A universally adjustable bearing comprising: a first member having a spheroidal socket with a central opening at a side thereof formed with an internal screw thread around said opening, and a second spheroidal member having a diametrical bore therein for receiving a shaft or the like and also having external screw threads on its equatorial area adapted to mesh with the screw thread on said first member only when the bore of the second member is disposed with its axis at a right angle to the opening of the first member, the threaded area of the second member being of equal extent on opposite sides of the equator of the second member.

8. A universally adjustable bearing comprising: a first member having a spheroidal socket with a central opening at a side thereof formed with an internal screw thread around said opening, and a second spheroidal member having a diametrical bore therein for receiving a shaft or the like and also having external screw threads on its equatorial area adapted to mesh with the screw thread on said first member only when the bore of the second member is disposed with its axis at a right angle to the opening of the first member, said second member having spheroidal surfaces on opposite sides of its threaded area and said first member having mating surfaces inwardly of its screw thread when because of greater diameter than the opening in the first member when said surfaces are engaged, prevents separation of said two members while the opening of the first member and the bore of the second member are in registration.

RICHARD T. REESE.

References Cited in the file of this patent

UNITED STATES PATENTS

| Number | Name | Date |
|---|---|---|
| 2,428,660 | Keahey | Aug. 9, 1949 |